United States Patent

[11] 3,596,740

| [72] | Inventor | Carl S. Nau<br>South Euclid, Ohio |
|---|---|---|
| [21] | Appl. No. | 6,110 |
| [22] | Filed | Jan. 27, 1970 |
| [45] | Patented | Aug. 3, 1971 |
| [73] | Assignee | TRW Inc.<br>Cleveland, Ohio<br>Continuation-in-part of application Ser. No.<br>746,586, July 22, 1968, now abandoned. |

[54] TORQUE LIMITER
18 Claims, 7 Drawing Figs.

[52] U.S. Cl. .................................................. 188/134,
192/8
[51] Int. Cl. ..................................................... B60t 7/12,
F16d 67/00
[50] Field of Search ........................................... 188/110,
134, 135; 192/8

[56] References Cited
UNITED STATES PATENTS
| 3,285,377 | 11/1966 | Rasmussen .................. | 188/134 X |
| 3,367,456 | 2/1968 | Bohnhoff ..................... | 188/134 |

*Primary Examiner*—Duane A. Reger
*Attorney*—Hill, Sherman, Meroni, Gross & Simpson ABSTRACT: A bidirectional torque limiter operable as a torque sensitive brake to stop the motion of the power supply while limiting the output torque when a jam occurs in the driven mechanism. The inertia of the power supply is dissipated by providing for limited relative motion between the input and output shafts of the torque limiter while absorbing the kinetic energy of the drive unit by means of a friction brake. By reversing input and output shafts, a torque-limiting device is provided which will not release following lockup even if the output torque is reduced to zero unless the input torque is reduced below the lockout torque level or is reversed in direction of rotation.

Patented Aug. 3, 1971
3,596,740
2 Sheets-Sheet 1
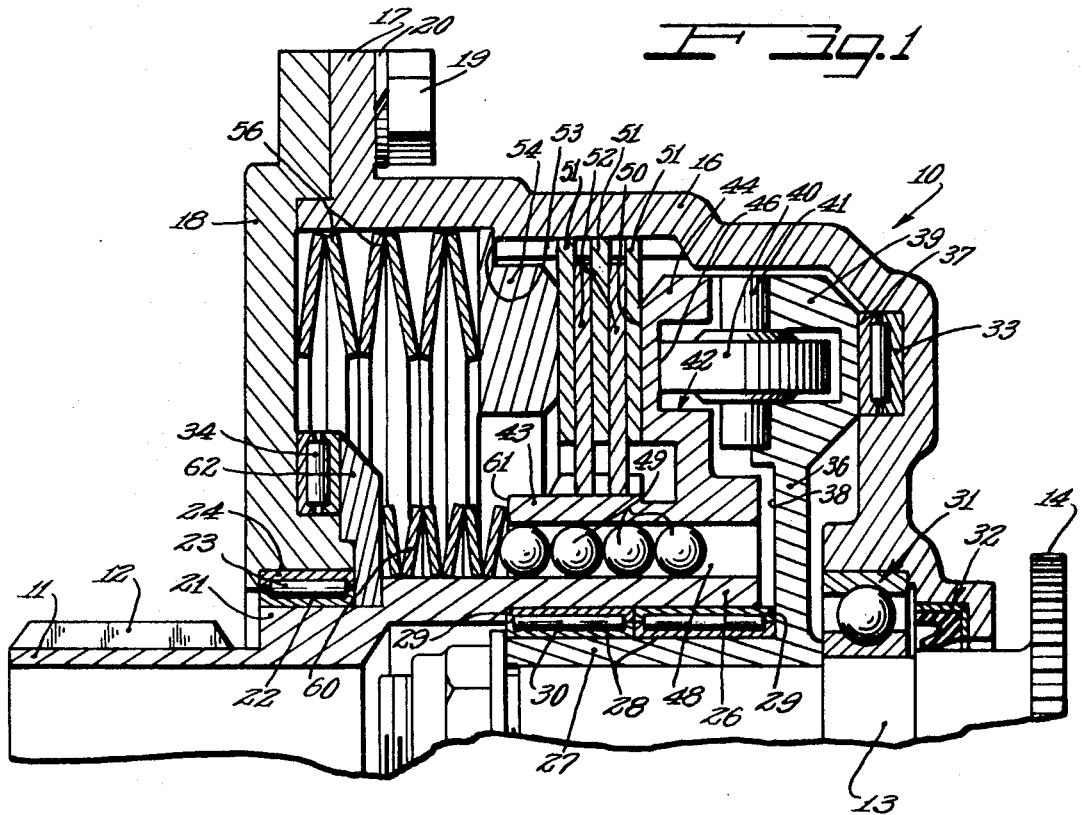
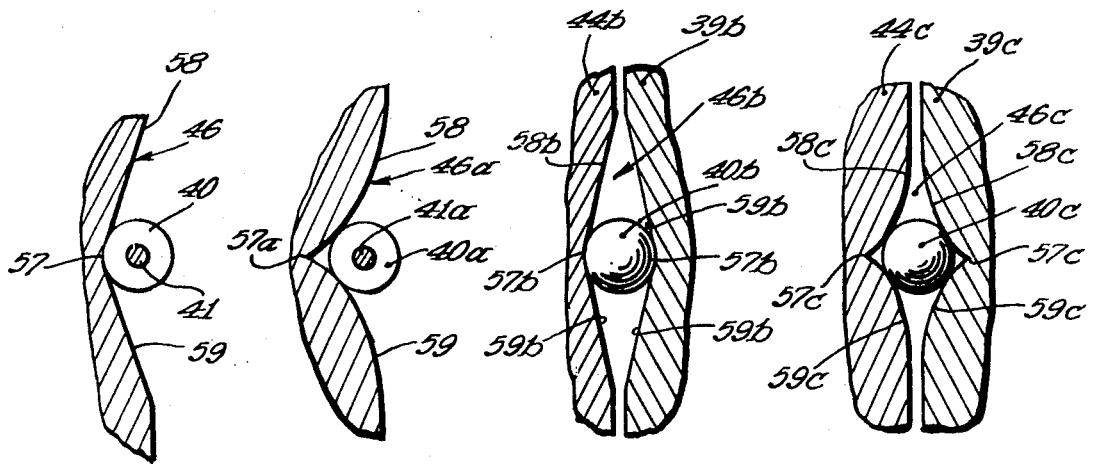
INVENTOR.
Carl S. Nau
BY Hill, Sherman, Meroni, Gross & Simpson ATTORNEYS

Patented Aug. 3, 1971
3,596,740
2 Sheets-Sheet 2
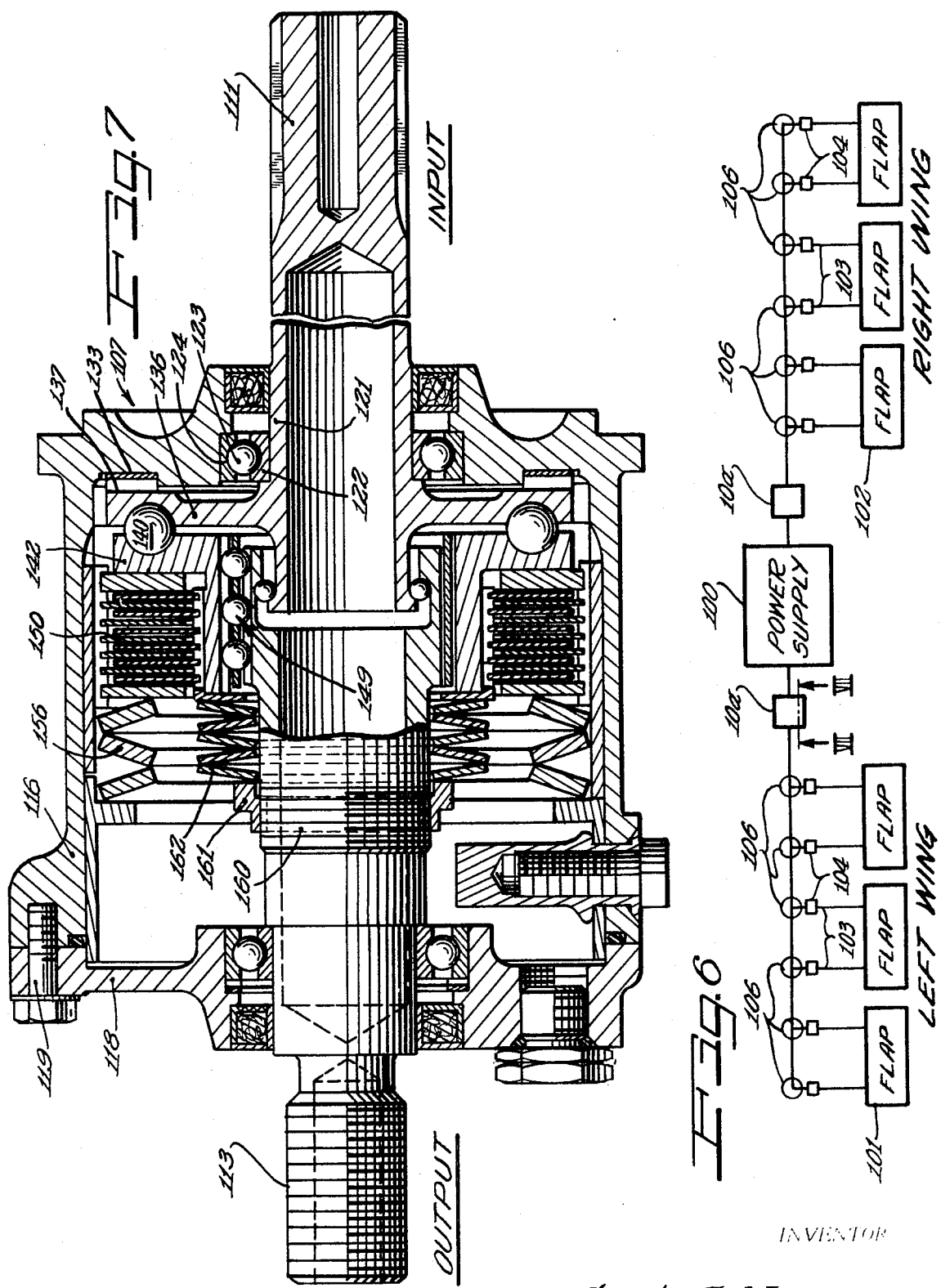
INVENTOR
Carl S. Nau
BY *Hill, Sherman, Meroni, Gross & Simpson* ATTORNEYS

TORQUE LIMITER

CROSS-REFERENCE TO RELATED APPLICATION

This application is a continuation-in-part of my copending application Ser. No. 746,586 filed July 22, 1968, now abandoned.

THE PRIOR ART

To minimize weight, modern aircraft utilize high-speed air or hydraulic motors to drive flaps, thrust reversers, landing gear doors and other power-operated accessories. However, because of the high rotational inertia, these motors can provide an output torque many times greater than their normal output if a jam occurs in the driven mechanism. To prevent damage to the driven mechanism in the event of a jam condition, torque-limiting devices are used to limit the output of the power unit.

In prior art attempts to provide a torque-limiting device, the approach has been generally to provide a torque-limiting clutch. Clutch-type torque limiters in accordance with prior art arrangements are unsatisfactory in many aircraft applications because of the loss of synchronization between the control system of the power supply and the driven member such as a wing flap, for example. Accordingly, any torque limiter operable on the mechanical principle of a slip clutch will be unsatisfactory.

Current aircraft flap system experience has dictated the need for a torque-limiting device which will not release following lockup, a capability not available in prior art devices.

SUMMARY OF THE INVENTION

In accordance with the principles of the present invention, rather than a slip clutch, it is contemplated to provide a torque-sensitive brake which will stop the motion of the power supply while limiting the output torque when a jam occurs in the driven mechanism. The device of the present invention is not limited to low speed operation as are the prior art devices. Rather, means have been specifically provided in accordance with the principles of the present invention to dissipate the inertia of the power supply. This is accomplished by providing for limited relative motion between the input and output shafts of the torque limiter while absorbing the kinetic energy of the drive unit by means of a friction brake. Synchronization between the input and output is not lost because, upon release of the jam in the driven system, the output shaft of the present invention will snap forward to its original angular orientation between the input and the output.

Reversal of input and output shafts places the brake on the output end of the device. By means of a multiplicity of brake disks the brake can be made self-energizing and will provide the required holding function even if the output torque is reduced to zero following lockup.

BRIEF DESCRIPTION OF THE DRAWINGS

FIG. 1 is a fragmentary cross-sectional view of a torque limiter provided in accordance with the principles of the present invention.

FIG. 2 is a fragmentary cross-sectional view showing a profile of a cam track as embodied in the torque limiter of FIG. 1.

FIG. 3 is a view similar to FIG. 2 but showing an alternative cam track profile.

FIGS. 4 and 5 are views which are generally similar to FIGS. 2 and 3, but show alternative embodiments of the invention wherein shiftable antifriction balls are used instead of cam followers which are connected together by means of a cage having a double ramp construction.

FIG. 6 is a schematic of a typical application of a torque limiter in a utilitarian environment, viz, the wing flap system of an aircraft.

FIG. 7 is a cross-sectional view taken on line VII—VII of FIG. 6.

DESCRIPTION OF THE PREFERRED EMBODIMENTS

There is shown generally at 10 a torque limiter in accordance with the principles of the present invention which can be effectively utilized in modern aircraft wherein high-speed air or hydraulic motors are used to drive flaps, thrust reversers, landing gear doors, and many other forms of actuated devices. Since the details of construction of the drive unit and the driven system are not necessary to a proper understanding of the principles of the present invention, it will be understood that the torque limiter 10 can be used in a variety of different end uses, but in each event, there is provided an input shaft which is labeled with the legend "input" and which is shown herein at 11 provided with a spline coupling 12 by means of which the input shaft may be connected to a drive unit.

There is also provided an output shaft labeled by the legend "output" and which is more specifically identified at 13 and comprises a spline coupling member 14 which may be connected to the drive train of a driven mechanism.

In order to form a casing for the torque limiter, a housing 16 is provided which is of generally cup-shaped configuration and has an outwardly extending flange 17. A cover member 18 abuts against the flange 17 of the housing 16 and is connected in firm assembly therewith by means of the usual fasteners shown at 19 and including lock washers 20.

The input shaft 11 has an axially extending portion 21 providing a seat for a race ring 22 in which are retained a plurality of shiftable bearing members 23, the opposite race ring 24 being positioned at the inner periphery of the cover member 18.

The innermost portion of the input shaft is shown at 26 and is disposed radially outwardly of an inwardly adjacent portion of the output shaft 13, which portion is shown at 27. A bearing construction including race members 28, 28 on the output shaft and race members 29, 29 on the input shaft, contain shiftable bearing members 30.

A bearing assembly is also interposed between respectively adjacent portions of the housing 16 and the output shaft as shown generally at 31. Additional bearing means are provided as shown at 33 in the housing member 16 and at 34 adjacent the cover member 18. A shaft seal for retention of lubricant is shown at 32.

Extending radially outwardly from the output shaft 13 is a flange 36 having a rear surface 37 engaging against the race ring of the bearing assembly 33. The opposite face of the flange 36 comprises what may be referred to herein as an action surface 38. In the form of the invention shown in FIG. 1 and FIG. 2, the flange 36 is provided with a bifurcated portion as at 39 thereby to carry in journaled relation a plurality of circumferentially spaced cam followers 40 each having a shaft 41.

Interposed between the input shaft 11 and specifically the innermost portion 26 thereof and the flange 36 of the output shaft 13, there is provided a cam ring shown generally at 42 and including an axially extending portion 43 as well as a radially extending portion 44.

The radially extending portion 44 has an action surface shown at 46 comprising a cam track for each respective cam follower 40.

In order to couple the cam ring 42 to the input shaft 11, a ball spline is provided as shown at 48 in which is received a plurality of spline balls 49. By virtue of such provision, it will be appreciated that the cam ring 42 is axially movable relative to the input shaft 11 with nearly frictionless axial movement. Thus, by the provision of such ball spline coupling, operational hysteresis of torque limiter 10 is minimized.

The surface of the radially extending flange 44 on the cam ring 42 shown at 50 engages against a first disk 51 of a multidisk brake herein shown as including separate disks 51, 51, 51 and 52, 52. The disks 51 remain stationary with the housing 16 while the disks 52 rotate with the cam ring 42. The latter disk 51 engages against a brake backup disk 54 biased by a plurality of linear force characteristic Belleville springs 56 which are operationally bottomed against the rear face of the brake backup disk 54 and are also operationally bottomed against the cover member 18. The backup disk 54 is operationally bottomed against the shoulder 53 of the housing 16 to insure full release of the brake. In the form of the invention shown in FIGS. 1 and 2, each cam track 46 is of a V-shaped configuration including a apical portion 57 and oppositely extending ramps 58 and 59 disposed in planar relation.

A spring biasing means shown in FIG. 1 as taking the form of a plurality of constant force characteristic Belleville spring washers 60 are operationally bottomed against the end surface of the cam member 42 as at 61 and are operationally bottomed against a bottoming member 62 which is in turn engageable with the race ring of the bearing assembly 34. Thus, the multiple cam followers 40 are normally held at the bottom 57 of the V-shaped cam tracks 46 during normal operation.

In the event of a jam of the driven system, the reaction force produced by the cam mechanism will exceed the preloaded spring force with the result that the input shaft 11 will rotate relative to the output shaft 13. At the same time, action of the cam followers 40 in the cam tracks 46 by movement up the ramps 58 or 59 depending on direction of rotation will cause axial movement of the cam disk 44, thereby engaging the multidisk friction brake 51 and 52.

Axial reaction force to the load applied by the cam disk 44 is provided by the spring means 56 bearing against the brake backup disk 54. Thus, the spring means 56 provides a gradually increasing brake torque as the driving unit is stalled out. Such spring means 56 thus permits dissipation of the kinetic energy of the power unit into the brake without producing high inertia torques in the drive train or the torque limiter 10.

The low hysteresis coupling connection between the input shaft 11 and the cam member 42 insures release of the torque limiter brake at a torque value only slightly below the torque at which lockout was initiated. Thus, synchronization between the input and output is not lost because upon release of the jam, the torque limiter output shaft 13 will snap forward to its original angular orientation whereupon the cam followers 40 will again bottom at the bottom 57 of the cam tracks 46.

Several different basic cam forms can be utilized without departing from the principles of the present invention. The simplest form is illustrated in FIG. 2 considered in conjunction with FIG. 1 wherein Belleville-type preloaded springs having a constant force configuration as shown at 60 are used in conjunction with cam tracks 46 having ramp portions 58 and 59 which are disposed in a planar relation and extend from the bottom 57 of the cam track.

For applications requiring a high mechanical gain, the cam profile shown in FIG. 3 may be effectively utilized. In that form of the invention wherein like parts are shown with like numerals with the suffix a, the cam track 46a is characterized by a V-shaped profile including a bottom portion 57a and a curvately configured ramp portion 58 and a curvately shaped ramp portion 59 extending in opposite directions therefrom. Thus, the curvately shaped ramp portions present a steep ramp angle opposing relative rotation in the normal driving mode and permits the use of a low-force preloading spring insofar as the spring means 60 is concerned. After exceeding the preload force, the movement of the cam follower 40a up the shallower ramp angle minimizes the effect of the preload spring 60, thus increasing the effective braking action. The brake spring means 56 insures return of the cam follower 40a down the shallow angle ramp if the overload is released.

As an alternate to the use of the cam followers 40 and 40a, a multiplicity of balls may be connected by means of a cage whereupon the double ramp construction shown by FIGS. 4 and 5 are required.

In FIG. 4, it will be noted that a plurality of balls 40b are substituted for the cam followers. The cage for retaining the balls 40b is shown at 44b and 39b and the double ramps forming the cam tracks 46b include bottom portions 57b and oppositely extending ramp portions 58b and 59b.

In FIG. 5, the shiftable balls are shown at 40c retained in the cage provided at 44c and 39c and movable in the cam tracks 46c each characterized by a bottom portion 57c and oppositely extending curvately shaped ramps 58c and 59c.

There is thus provided a torque limiter to provide relative motion between the input and output shafts without loss of synchronization including a brake backup spring for dissipation of driving unit inertia, and utilizing a ball spline on the input cam plate to minimize unit hysteresis. Further, the brake backup spring permits the use of a double ramp angle on the cam thus obtaining a high mechanical gain while still retaining the ability to release when the output torque drops below the torque at which lockout was initiated.

Referring now to FIG. 6, there is illustrated a typical application of a torque limiter in accordance with this invention in a utilitarian environment. Although the present invention is of widespread utility, the illustrative embodiment herein described is the wing flap system of an aircraft.

A power supply is shown at 100 and operates through two main torque limiters 10a, 10a, respectively, to actuate wing flaps shown at 101 for the left wing and 102 for the right wing. Between each flap 101 and/or 102 and a corresponding main torque limiter 10a, 10a, is a ball screw 103, a conventional spring-type torque limiter 104 and an angled gear box 106.

Reversal of power supply direction of rotation or reduction of driving torque below the lockout value of the main torque limiters 10a, 10a, causes the main torque limiters 10a, 10a to release. Release of the downstream torque limiters 104 does not result in the release of the main torque limiters 10a, 10a.

The device of FIGS. 1—5 will provide such requirements is the shaft previously labeled "output" is used as the "input" and vice versa. Thus, the brake is on the output end of the device rather than on the input end. By means of a multiplicity of brake disks, the brake can be made self-energizing and will provide the required holding function even if the output torque is reduced to zero.

However, a structural variation of the device of FIGS. 1—5 to accomplish those objectives in the specific form of its end use may be advantageously made. In !FIG. 6 is illustrated such a specific form of device for use in an aircraft wing flap system.

The specific torque limiter of FIG. 7 is shown generally at 107 and comprises an input shaft which is labeled with the legend "input" and which is shown at 111. There is also provided an output shaft labeled by the legend "output" and which is more specifically identified at 113. A casing 116 is closed by a cover member 118 and is connected by means of fasteners shown at 119. The input shaft 111 has an axially extending portion 121 providing a seat for a race ring 122 in which are retained a plurality of suitable bearing members 123, the opposite race ring 124 being positioned within the casing 116.

Extending radially outwardly from the input shaft 111 is a flange 136 having a rear surface 137 engaging against a brake thrust bearing 133. The opposite face of the flange 136 comprises a face confronting an opposing plate 142. A plurality of balls 140 are disposed between the two plates 136 and 142 and it will be understood that there is formed a plurality of face cams, for example, six face cams are equally spaced on a common diameter of the two opposing plates 136 and 142 with the balls 140 as the rolling elements between the cam surfaces. The geometry of the cams produces an axial force component of the load torque. Such axial force is opposed by the partially compressed actuation spring which is shown at 156. When the axial force component of the transmitted torque exceeds the actuation spring preload, the balls 140 are forced to roll over the cam contours as relative rotation occurs between the two cam plates 136 and 142. The resulting axial travel of the downstream cam plate 142 compresses the brake disks together and against the brake spring 156. In this regard, the brake disks are shown at 150.

As a result of proper selection of the cam angle, number of brake surfaces, and brake coefficient of friction, the available brake torque will always exceed the driving torque, even if the downstream torque is reduced to zero after lockup. Cam plate relative rotation and axial travel of the downstream cam plate 142 ceases when a force balance has been reestablished. With proper proportioning of the components, the downstream torque will remain close to the actuation level, while the upstream system is brought to a smooth stop within 5° of rotation, although it may be 20 or more degrees of rotation in some end use applications.

Release of the brake occurs when the upstream torque is reduced slightly below the minimum lockout torque, or if the upstream shaft direction of rotation is reversed. Then the balls 140 are forced to roll back to the central position in the cam surfaces as the upstream plate 136 is rotated backward by the torque component of the force stored in the actuator and brake springs 156. The resultant axial travel of the downstream cam plate releases the compression of the brake disks 150, freeing the mechanism for normal torque transmission. To provide an immediate reaction to changes in force balance, the downstream cam plate 142 is driven through a ball spline shown generally at 149. Thus, only a small reduction of the upstream torque below the actuation torque level is needed for release of the brake.

It will be appreciated, therefore, that the approach utilized in the device of FIG. 7 contemplates that a limited rotational relative movement between the upstream and downstream torque elements of the mechanism will apply force to a brake and provide a controlled deceleration of the upstream system. Thus, a face cam is used which provides axial movement and torque force amplification to energize the brake when the transmitted torque exceeds a preset limit. The transmitted torque will be limited in both directions of rotation and for either forward or back driving conditions. A portion of the system energy is stored within the mechanism during brake application and serves to disengage the brake when the upstream torque is reversed or reduced to normal operating levels. A reduction in downstream torque down to and including zero following lockup will not cause the unit to release.

It will be noted that the output shaft 113 has a threaded portion 160 on which is threaded a lockout torque adjustment nut 161 against which is bottomed an adjusting spring 162 so that lockout torque may be selectively varied. The other end of the spring 162 is bottomed against the end of the output cam plate 142.

It will be understood that the device of FIG. 7 has action surfaces on the plate members 136 and 142 which can be considered as the upstream and downstream torque means, corresponding to the various action surfaces described in connection with FIGS. 1—5.

Although various minor modifications might be suggested by those versed in the art, it should be understood that I wish to embody within the scope of the patent warranted hereon all such modifications as reasonably and properly come within the scope of my contribution to the art.

I claim as my invention:

1. A torque limiter comprising,
an input shaft connected to a driving unit,
an output shaft connected to a driven system,
a cam ring concentrically disposed relative to said input shaft and having a radial action face confronting an adjoining action face on said output shaft,
a ball spline coupling connected between said input shaft and said cam ring,
whereby relative axial movement of said input shaft and said cam ring is accommodated,
shiftable cam means between said action faces,
spring means normally preloading said cam ring to retain said cam means at a first position relative to said action faces during normal operation,
and a multidisk friction brake including a spring-loaded brake backup disk axially adjacent said cam ring,
whereby in the event of a jam in the driven system, relative rotation of the input and output shafts at the action faces will axially displace said cam ring to a second position for engaging the brake and providing a gradually increasing brake torque as the driving unit is stalled out for dissipating the kinetic energy of the power unit into the brake without producing high inertia torques in the drive train or the torque limiter.

2. A torque limiter as defined in claim 1 wherein said action surface on said cam ring has a plurality of V-shaped cam tracks each formed with an apical bottom portion and planar ramp portions extending away therefrom and said output shaft has a corresponding plurality to cam followers normally held at the bottom of said cam tracks but shiftable up the ramp portions thereof for the purposes set forth.

3. A torque limiter as defined in claim 2 wherein said spring means comprises Belleville type spring washers having a constant force configuration.

4. A torque limiter as defined in claim 1 wherein said action surface on said cam ring has a plurality of curved V-shaped cam tracks each formed with a apical bottom portion and curvately formed ramp portions providing an initial steep ramp angle, and said output shaft has a corresponding plurality of cam followers normally held at the bottom of said cam tracks but shiftable up the ramp portions thereof for the purposes set forth.

5. A torque limiter as defined in claim 4 wherein said spring means comprises a low force preloading spring.

6. A torque limiter as defined in claim 1 and further characterized by said cam means comprising a plurality of balls, said action surfaces comprising a cage connecting said balls and being formed with double raMped cam tracks each comprising a V-shaped track with an apical bottom portion and oppositely extending ramp portions.

7. A torque limiter as defined in claim 6 wherein said ramp portions are disposed in planar relation.

8. A torque limiter as defined in claim 6 wherein each of said ramp portions is curvately formed to provide a steep ramp angle.

9. A torque limiter comprising,
input shaft means adapted to be connected to a driving unit,
output shaft means adapted to be connected to a driven system,
cam ring means operatively disposed between said input and output shaft means and having a low hysteresis ball spline coupling connection between said input shaft means and said cam means,
said cam means including cam tracks and cam track followers normally bottomed during normal operation but relatively movable in the event of a jam in the driven system to shift the cam means relative to the input shaft means,
and a brake actuated by said cam means upon shifting,
thereby to provide a gradually increasing brake torque as the driving unit is stalled out and permitting dissipation of the kinetic energy of the power unit into the brake without producing high inertia torques in the drive train or torque limiter.

10. A torque limiter comprising,
an upstream torque element comprising an input shaft connected to a driving unit,
a downstream torque element comprising an output shaft connected to a driven system,
a cam ring concentrically disposed relative to one of said shafts and having a radial action face confronting an adjoining action face on the other of said shafts,
a ball spline coupling connection between said one shaft and said cam ring,
whereby relative axial movement of said one shaft and said cam ring is accommodated,
shiftable cam means between said action faces,
spring means normally preloading said cam ring to retain said cam means at a first position relative to said action faces during normal operation,
and a multidisk friction brake including a spring-loaded brake backup disk axially adjacent said cam ring, whereby the transmitted torque will be limited in both directions of rotation and for either forward or backdriving conditions, a portion of the system energy being stored within the limiter during braking application serving to disengage the brake when the upstream torque is reversed or reduced to normal operating levels, but a reduction in downstream torque down to and including zero following lockup will not cause the unit to release.

11. A torque limiter as defined in claim 10 wherein one of said action faces on one of said torque elements has a plurality of V-shaped cam tracks each formed with an apical bottom portion and planar ramp portions extending away therefrom and a corresponding pluraLity of cam followers on the other torque element normally held at the bottom of said cam tracks but shiftable up the ramp portions thereof for the purposes set forth.

12. A torque limiter as defined in claim 11 wherein said spring means comprises Belleville-type spring washers having a constant force configuration.

13. A torque limiter as defined in claim 10 wherein said action face on said cam ring of one of said torque elements has a pluraLity of curved V-shaped cam tracks each formed with an apical bottom portion and curvately formed ramp portions providing an initial steep ramp angle, and said other torque element has a corresponding plurality of cam followers normally held at the bottom of said cam tracks but shiftable up the ramp portions thereof for the purposes st forth.

14. A torque limiter as defined in claim 13 wherein said spring means comprises a low force preloading spring.

15. A torque limiter as defined in claim 10 and further characterized by said cam means comprising a plurality of balls, said action surfaces comprising a cage connecting said balls and being formed with double raMped cam tracks each comprising a V-shaped track with an apical bottom portion and oppositely extending ramp portions.

16. A torque limiter as defined in claim 15 wherein said ramp portions are disposed in planar relation.

17. A torque limiter as defined in claim 15 wherein each of said ramp portions is curvately formed to provide a steep ramp angle.

18. A torque limiter comprising,
upstream torque element means adapted to be connected to a driving unit,
downstream torque element means adapted to be connected to a driven system,
cam ring means operatively disposed between said upstream and downstream torque element means and having a low hysteresis ball spline coupling connection between said torque element means and said cam means,
said cam means including cam tracks and cam track followers normally bottomed during normal operation but relatively movable in the event of a jam in the driven system to shift the cam means relative to the torque element means, and a brake actuated by said cam means upon shifting, thereby to provide a gradually increasing brake torque as the driving unit is stalled out and permitting dissipation of the kinetic energy of the power unit into the brake without producing high inertia torques in the drive train or torque limiter, but wherein reduction in downstream torque down to and including zero following lockup will not cause the unit to release.